(12) United States Patent
Wang et al.

(10) Patent No.: US 12,145,635 B2
(45) Date of Patent: Nov. 19, 2024

(54) SEAT MOUNTING STRUCTURE AND TRAIN HAVING SAME

(71) Applicant: CRRC QINGDAO SIFANG CO., LTD., Shandong (CN)

(72) Inventors: Xingji Wang, Shandong (CN); Bin Liu, Shandong (CN); Qilong Shi, Shandong (CN); Keshu Zhang, Shandong (CN); Bingsong Wang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 738 days.

(21) Appl. No.: 17/426,342

(22) PCT Filed: Dec. 23, 2019

(86) PCT No.: PCT/CN2019/127614
§ 371 (c)(1),
(2) Date: Jul. 28, 2021

(87) PCT Pub. No.: WO2020/155935
PCT Pub. Date: Aug. 6, 2020

(65) Prior Publication Data
US 2022/0097737 A1 Mar. 31, 2022

(30) Foreign Application Priority Data

Jan. 30, 2019 (CN) .......................... 201910101631.5
Jan. 30, 2019 (CN) .......................... 201920165639.3

(51) Int. Cl.
*B61D 33/00* (2006.01)
(52) U.S. Cl.
CPC ..... *B61D 33/0064* (2013.01); *B61D 33/0014* (2013.01)
(58) Field of Classification Search
CPC . B61D 33/0064; B61D 33/0014; B60N 2/242
See application file for complete search history.

(56) References Cited

U.S. PATENT DOCUMENTS

| 2,139,852 | A | * | 12/1938 | Rossell | ................. | B60N 2/242 |
| | | | | | | 297/183.6 |
| 2,502,320 | A | * | 3/1950 | Guernsey | .............. | B62D 31/02 |
| | | | | | | 105/397 |

(Continued)

FOREIGN PATENT DOCUMENTS

| CN | 102273839 A | 12/2011 |
| CN | 203995760 U | 12/2014 |

(Continued)

OTHER PUBLICATIONS

International Search Report for corresponding application PCT/CN2019/127614 filed Dec. 23, 2019; Mail date Mar. 27, 2020.

(Continued)

*Primary Examiner* — Scott A Browne
(74) *Attorney, Agent, or Firm* — CANTOR COLBURN LLP

(57) ABSTRACT

The disclosure provides a seat mounting structure and a train having same. The seat mounting structure includes a seat body (10), a side wall mounting member (20) and a suspension mounting rod (40), wherein a first end of the seat body is connected to a carriage side wall (30) by the side wall mounting member; one end of the suspension mounting rod is connected to a carriage roof, and the other end of the suspension mounting rod is connected to a second end of the seat body; wherein the first end of the seat body is one end, close to the carriage side wall, of the seat body, and the second end of the seat body is one end, away from the carriage side wall, of the seat body. The seat mounting structure provides an effective support for a suspension seat to improve a structural strength of the suspension seat.

13 Claims, 3 Drawing Sheets

(56) References Cited

U.S. PATENT DOCUMENTS

| | | | | |
|---|---|---|---|---|
| 3,630,566 A | * | 12/1971 | Barecki | B60N 2/242 |
| | | | | 105/345 |
| 3,747,979 A | * | 7/1973 | Barecki | B62D 47/02 |
| | | | | 296/63 |
| 3,797,887 A | * | 3/1974 | Barecki | B60N 2/242 |
| | | | | 297/DIG. 2 |
| 4,036,527 A | * | 7/1977 | Faul | B60N 2/242 |
| | | | | 297/232 |
| 4,249,769 A | * | 2/1981 | Barecki | B60N 2/242 |
| | | | | 296/68.1 |
| 4,570,545 A | * | 2/1986 | Sherrow | B61D 37/00 |
| | | | | 105/345 |
| 5,464,273 A | | 11/1995 | Makoto | |
| 6,416,116 B1 | * | 7/2002 | Stanton | B61D 27/0018 |
| | | | | 454/108 |
| 6,568,735 B1 | * | 5/2003 | Lohr | B60N 2/242 |
| | | | | 296/63 |
| 9,566,890 B2 | * | 2/2017 | McDowell | B60N 3/026 |

FOREIGN PATENT DOCUMENTS

| | | |
|---|---|---|
| CN | 105555600 A | 5/2016 |
| CN | 208006958 U | 10/2018 |
| CN | 109606403 A | 4/2019 |
| CN | 209667093 U | 11/2019 |
| DE | 19653025 A1 | 6/1998 |
| EP | 2700554 A1 | 2/2014 |
| EP | 3103696 A1 | 12/2016 |
| EP | 3257703 A1 | 12/2017 |
| ES | 2433114 A2 | 12/2013 |
| FR | 2371312 A1 | 6/1978 |
| WO | 2016096419 A1 | 6/2016 |

OTHER PUBLICATIONS

European Search Report for corresponding application EP19913916; Mail date Aug. 10, 2022.

* cited by examiner

SEAT MOUNTING STRUCTURE AND TRAIN HAVING SAME

CROSS-REFERENCE TO RELATED APPLICATION

The disclosure claims the priority of Chinese Patent Application No. 201910101631.5, 201920165639.3, filed to the Chinese Patent Office on Jan. 30, 2019 and entitled "Seat Mounting Structure and Train Having Same".

TECHNICAL FIELD

The disclosure relates to the field of train apparatuses, in particular to a seat mounting structure and a train having same.

BACKGROUND

Rail transit refers to a means of transport or transportation system in which an operating vehicle needs to travel on a particular rail. The most typical rail transit is a railway system consisting of traditional trains and standard railways. As the train and railway technologies develop diversely, the rail transit also becomes increasingly diversified. It is spread over long-distance land transportation, and is also widely applied to medium and short-distance urban public transportation.

In the seat design of an existing rail vehicle, a transverse seat can provide a more comfortable seat environment than a longitudinal seat. In order to guarantee the structural strength, as shown in FIG. 1, a traditional transverse seat 1 needs to be fixed at the train side wall 2, and moreover, a support leg 3 needs to be additionally provided on the aisle side. The support leg 3 of the transverse seat 1 influences the attractiveness and increase the actual space occupation, which hinders the arrangement of other structures.

As shown in FIG. 2, the transverse seat structure is improved to a cantilever seat 4, since the support leg at the aisle is omitted, the strength of the seat is guaranteed by additionally arranging a support member 5 at the side wall, and a common structure is provided with a T-shaped support and an inclined supporting beam. The improved cantilever seat 4 is compact in structure, smaller in occupied space and more convenient to clean from below.

However, the size of the mounting base at the side wall is increased due to the cantilever seat, and a cover plate is usually required to be mounted to shield the mounting base, which influences the overall sealing of the side wall while the attractiveness is influenced, and the overall weight is also increased. In addition, the support area of the mounting base at the side wall is limited, and therefore cannot provide effective support for the aisle side of the seat. Consequently, the seat obviously sinks when used, which affects riding comfort. Meanwhile, the structural strength of the cantilever seat has certain defects.

SUMMARY

The objective of the disclosure provides a seat mounting structure and a train having same so as to solve the problem of low structural strength of a cantilever seat in the related art.

For achieving the above objective, a first aspect of the disclosure provides a seat mounting structure, including: a seat body; a side wall mounting member, wherein a first end of the seat body is connected to a carriage side wall by the side wall mounting member; and a suspension mounting rod, wherein one end of the suspension mounting rod is connected to a carriage roof, and the other end of the suspension mounting rod is connected to a second end of the seat body; wherein the first end of the seat body is one end, close to the carriage side wall, of the seat body, and the second end of the seat body is one end, away from the carriage side wall, of the seat body.

In an embodiment, a plurality of the side wall mounting members are provided, and the first end of the seat body is fixedly connected to the carriage side wall by the plurality of side wall mounting members.

In an embodiment, the plurality of side wall mounting members are arranged at intervals in a height direction of the carriage side wall.

In an embodiment, the seat body includes a bottom plate and a backrest; wherein the plurality of side wall mounting members include a first side wall mounting member, and the bottom plate is fixedly connected to the carriage side wall by the first side wall mounting member.

In an embodiment, the first side wall mounting member includes a connector and a fastener, the connector being connected to the seat body, and the fastener penetrating the connector and the carriage side wall.

In an embodiment, the carriage side wall includes a shield plate, the connector is a bent plate, and the fastener is a fastening bolt, the fastening bolt penetrating the bent plate and the shield plate to fasten the bent plate and the shield plate.

In an embodiment, the seat body includes opposite two side plate portions, the two side plate portions defining a seating area for accommodating a passenger; and the connector is connected to a bottom of the side plate portion, close to the carriage side wall, of the seat body.

In an embodiment, the plurality of side wall mounting members further include a second side wall mounting member, and the backrest is fixedly connected to the carriage side wall by the second side wall mounting member.

In an embodiment, the seat body includes opposite two side plate portions, the two side plate portions defining a seating area for accommodating a passenger; and the second side wall mounting member penetrates the side plate portion, close to the carriage side wall, of the seat body and the carriage side wall.

In an embodiment, the second side wall mounting member has a threaded rod section, a threaded stud is provided on the carriage side wall, and the second side wall mounting member penetrates the side plate portion and the shield plate of the carriage side wall and then is in threaded connection to the threaded stud.

In an embodiment, the seat body includes opposite two side plate portions, the two side plate portions defining a seating area for accommodating a passenger; and the first end of the seat body is the side plate portion, close to the carriage side wall, of the seat body, and the second end of the seat body is one end, away from the carriage side wall, of a top of the seat body.

In an embodiment, a top cross beam is provided on the seat body, and the second end of the seat body is one end, away from the carriage side wall, of the top cross beam.

In an embodiment, a shield plate is provided on the carriage side wall, and the shield plate is arranged in a vertical direction and opposite to the backrest; wherein the second side wall mounting member penetrates into the shield plate so as to fixedly connect the backrest to the carriage side wall.

In an embodiment, a boss structure is provided at a bottom of the carriage side wall, and the boss structure extends in an extension direction of the carriage side wall; wherein the first side wall mounting member abuts against an upper surface of the boss structure.

In an embodiment, the seat body includes a bottom plate and a backrest; wherein the suspension mounting rod is connected to the backrest.

In an embodiment, an end of the suspension mounting rod is provided with an articulated element, and the suspension mounting rod is hinged to the seat body by the articulated element.

The embodiment of the disclosure provides a seat mounting structure. The seat mounting structure includes: a seat body; a side wall mounting member, wherein a side of the seat body is connected to a carriage side wall by the side wall mounting member; and a suspension mounting rod, wherein one end of the suspension mounting rod is connected to a carriage roof, and the other end of the suspension mounting rod is connected to a top of the seat body.

A second aspect of the disclosure provides a train. The train includes a seat mounting structure which is the seat mounting structure mentioned above.

The seat mounting structure applying the technical solution of the disclosure includes a seat body, a side wall mounting member and a suspension mounting rod, wherein a first end of the seat body is connected to a carriage side wall by the side wall mounting member; one end of the suspension mounting rod is connected to a carriage roof, and the other end of the suspension mounting rod is connected to a second end of the seat body; wherein the first end of the seat body is one end, close to the carriage side wall, of the seat body, and the second end of the seat body is one end, away from the carriage side wall, of the seat body. The seat mounting structure may provide an effective support for a suspension seat to improve a structural strength of the suspension seat without increasing a size of a mounting base at the side wall. The problem of low structural strength of a cantilever seat in the related art is solved.

BRIEF DESCRIPTION OF THE DRAWINGS

The accompanying drawings of the description forming a part of the disclosure serve to provide a further understanding thereof, the illustrative embodiments of the disclosure and the description of the illustrative embodiments serve to explain the disclosure and are not to be construed as unduly limiting the disclosure. In the drawings.

Figure 1:
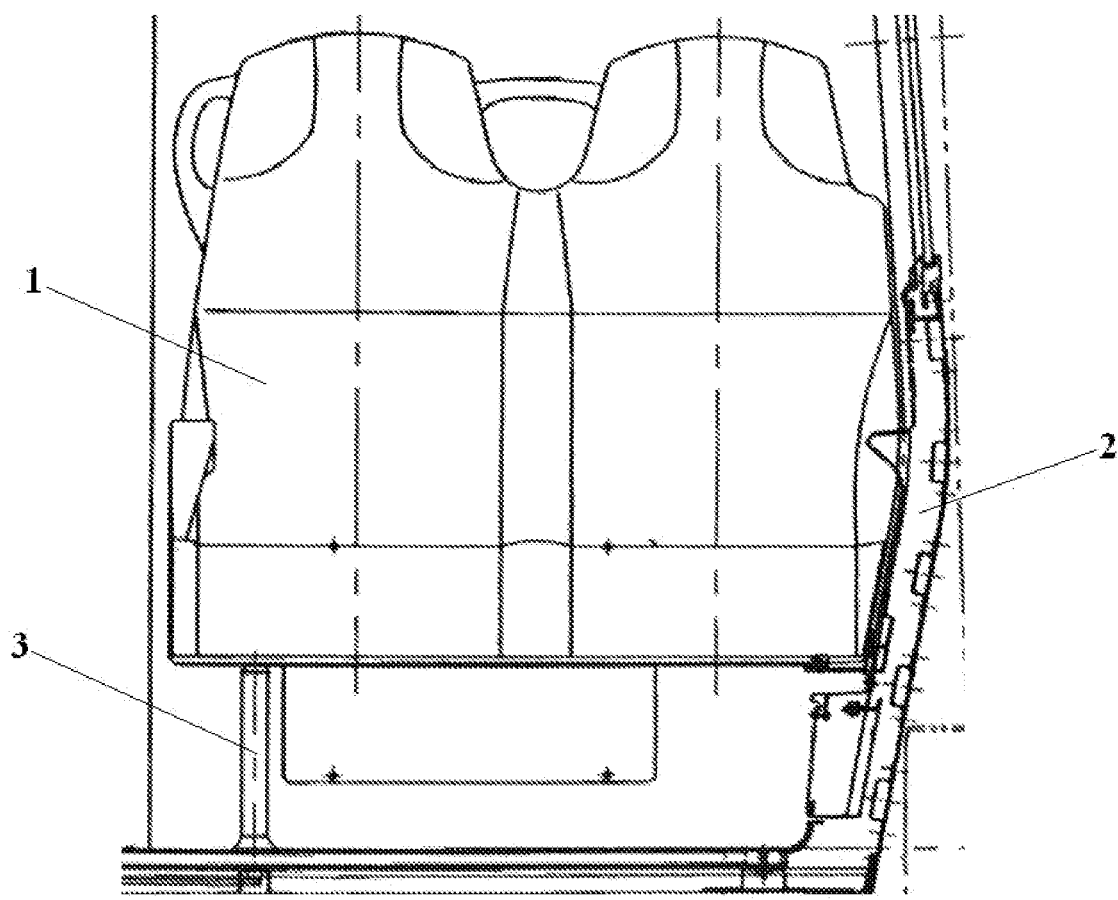
FIG. 1 is a schematic diagram of an existing seat mounting structure.
Figure 2:
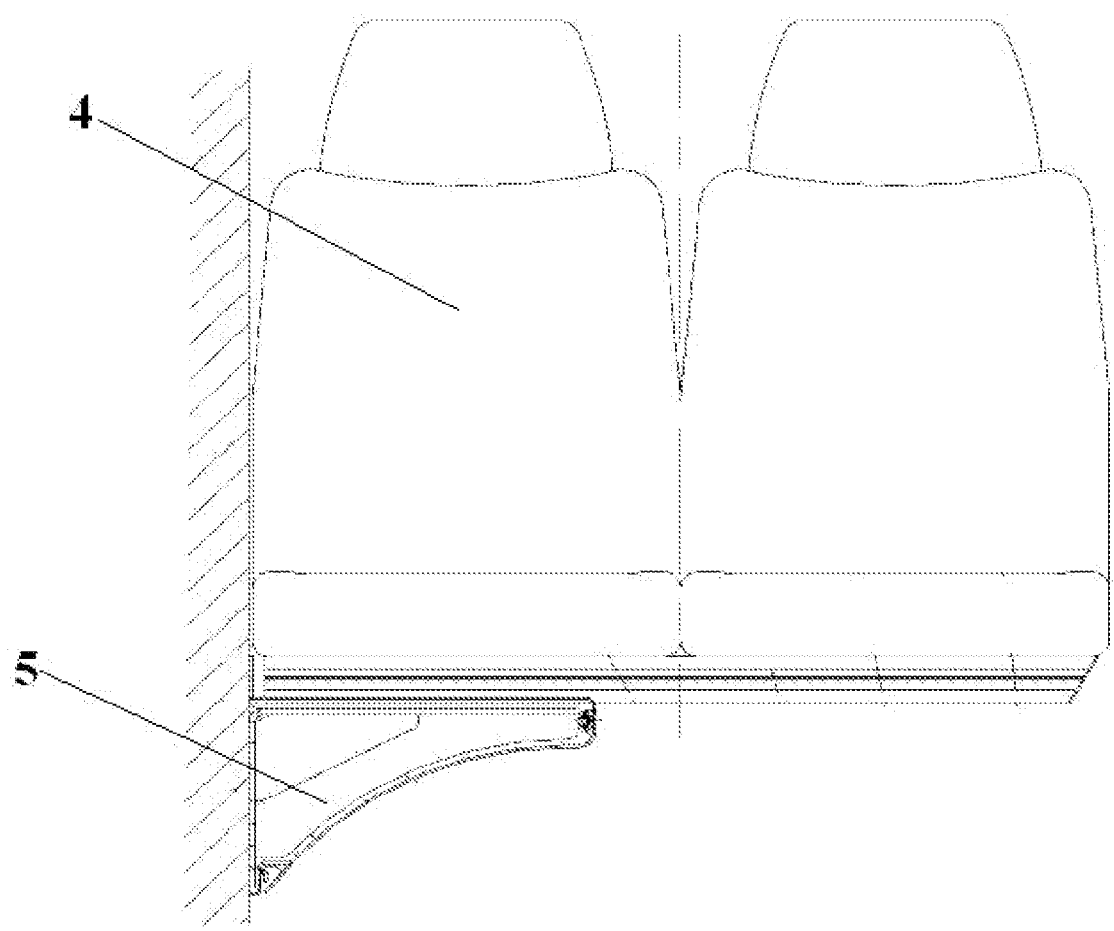
FIG. 2 is a schematic diagram of another existing seat mounting structure.

The above-mentioned figures include the following reference numerals:

1. transverse seat; 2. train side wall; 3. support leg; 4. cantilever seat; 5. support member;

10. seat body; 11. bottom plate; 12. backrest; 13. side plate portion; 14. top cross beam; 20. side wall mounting member; 21. first side wall mounting member; 211. connector; 212. fastener; 22. second side wall mounting member; 30. carriage side wall; 31. shield plate; 32. boss structure; 40. suspension mounting rod.

DETAILED DESCRIPTION OF THE EMBODIMENTS

It should be noted that the embodiments of the disclosure and the features of the embodiments is combined with each other without conflict. The disclosure will be described in detail below with reference to the accompanying drawings in conjunction with embodiments.

Figure 3:
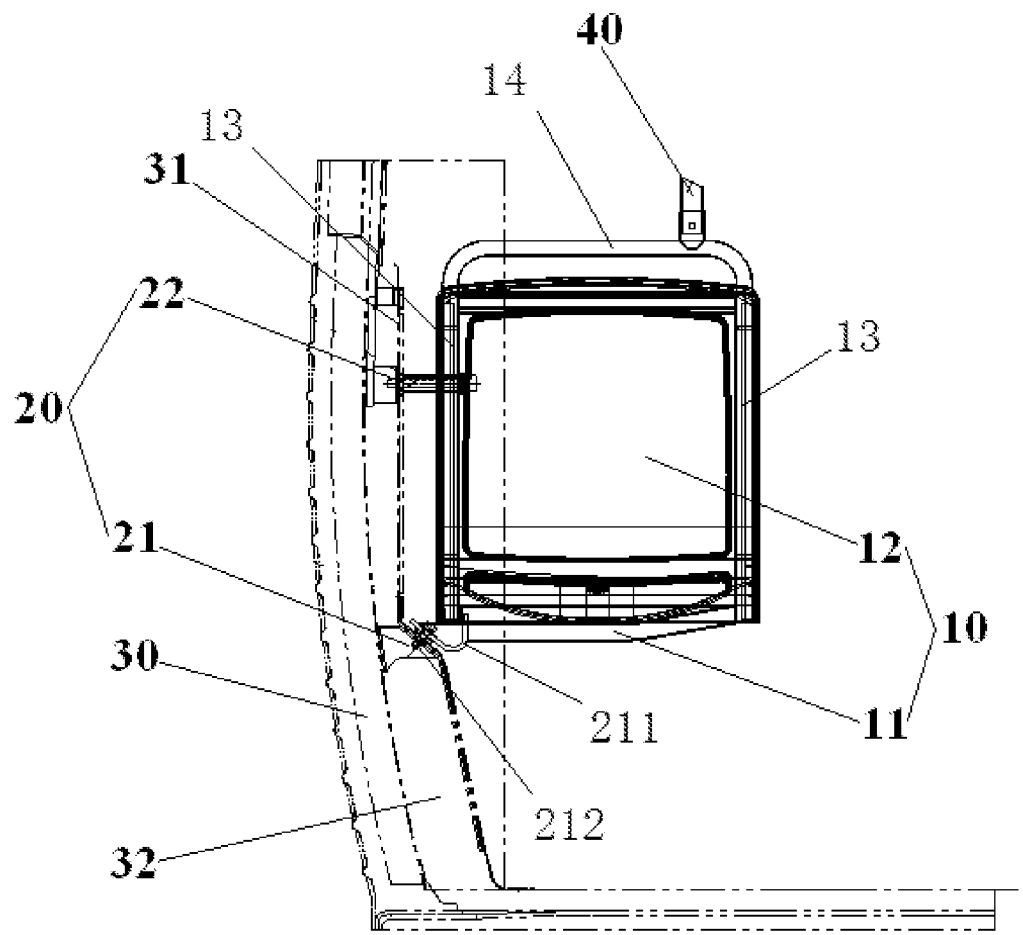
FIG. 3 is a schematic diagram of an optional seat mounting structure according to an embodiment of the disclosure.

As shown in FIG. 3, the seat mounting structure according to the embodiment of the disclosure includes a seat body 10, a side wall mounting member 20 and a suspension mounting rod 40, wherein a first end of the seat body 10 is connected to a carriage side wall 30 by the side wall mounting member 20; one end of the suspension mounting rod 40 is connected to a carriage roof, and the other end of the suspension mounting rod 40 is connected to a second end of the seat body 10; wherein the first end of the seat body 10 is one end, close to the carriage side wall 30, of the seat body 10, and the second end of the seat body 10 is one end, away from the carriage side wall 30, of the seat body 10.

The seat mounting structure applying the technical solution of the disclosure includes a seat body 10, a side wall mounting member 20 and a suspension mounting rod 40, wherein a first end of the seat body 10 is connected to a carriage side wall 30 by the side wall mounting member 20; one end of the suspension mounting rod 40 is connected to a carriage roof, and the other end of the suspension mounting rod 40 is connected to a second end of the seat body 10; wherein the first end of the seat body 10 is one end, close to the carriage side wall 30, of the seat body 10, and the second end of the seat body 10 is one end, away from the carriage side wall 30, of the seat body 10. The seat mounting structure may provide an effective support for a suspension seat to improve a structural strength of the suspension seat without increasing a size of a mounting base at the side wall. The problem of low structural strength of a cantilever seat in the related art is solved.

In particular implementations, the seat mounting structure is arranged as follows: a seat mounting structure includes a seat body 10; a side wall mounting member 20 and a suspension mounting rod 40, wherein a side of the seat body 10 is connected to a carriage side wall 30 by the side wall mounting member 20, one end of the suspension mounting rod 40 is connected to a carriage roof, and the other end of the suspension mounting rod 40 is connected to a top of the seat body 10.

In particular implementations, a plurality of the side wall mounting members 20 are provided, and the plurality of side wall mounting members 20 are arranged at intervals in a height direction of the carriage side wall 30. The first end of the seat body 10 is fixedly connected to the carriage side wall 30 by the side wall mounting members 20. Specifically, the seat body 10 includes a bottom plate 11 and a backrest 12; the two side wall mounting members 20 are provided, the two side wall mounting members 20 include a first side wall mounting member 21 and a second side wall mounting member 22, the bottom plate 11 is fixedly connected to the carriage side wall 30 by the first side wall mounting member 21, and the backrest 12 is fixedly connected to the carriage side wall 30 by the second side wall mounting member 22. The plurality of side wall mounting members 20 are connected to the bottom plate 11 and the backrest 12 of the seat body 10 separately, thereby effectively improving the structural strength of connection, and guaranteeing the stability of the seat body 10.

For ease of the connection between the seat body 10 and the carriage side wall 30, as shown in FIG. 3, the first side wall mounting member 21 includes a connector 211 and a fastener 212, the connector 211 being connected to the seat body 10, and the fastener 212 penetrating the connector 211 and the carriage side wall 30.

In the present embodiment, as shown in FIG. 3, the carriage side wall 30 includes a shield plate 31, the connector 211 is a bent plate, and the fastener 212 is a fastening bolt, the fastening bolt penetrating the bent plate and the shield plate 31 to fasten the bent plate and the shield plate 31.

Specifically, the seat body 10 includes opposite two side plate portions 13, the two side plate portions 13 defining a seating area for accommodating a passenger; and the connector 211 is connected to a bottom of the side plate portion 13, close to the carriage side wall 30, of the seat body 10.

Further, a shield plate 31 is provided on the carriage side wall 30, and the shield plate 31 is arranged in the vertical direction and opposite to the backrest 12; wherein the second side wall mounting member 22 penetrates into the shield plate 31 so as to fixedly connect the backrest 12 to the carriage side wall 30; a boss structure 32 is arranged at a bottom of the carriage side wall 30, and the boss structure 32 extends in the extension direction of the carriage side wall 30; wherein the first side wall mounting member 21 abuts against an upper surface of the boss structure 32.

In the present embodiment, as shown in FIG. 3, the seat body 10 includes opposite two side plate portions 13, the two side plate portions 13 defining a seating area for accommodating a passenger; and the second side wall mounting member 22 penetrates the side plate portion 13, close to the carriage side wall 30, of the seat body 10 and the carriage side wall 30.

Specifically, the second side wall mounting member 22 has a threaded rod section, a threaded stud is provided on the carriage side wall 30, and the second side wall mounting member 22 penetrates the side plate portion 13 and the shield plate 31 of the carriage side wall 30 and then is in threaded connection to the threaded stud.

In the present embodiment, the seat body 10 includes opposite two side plate portions 13, the two side plate portions 13 defining a seating area for accommodating a passenger; and the first end of the seat body 10 is the side plate portion 13, close to the carriage side wall 30, of the seat body 10, and the second end of the seat body 10 is one end, away from the carriage side wall 30, of a top of the seat body 10.

For ease of connection between the seat body 10 and the carriage roof, a top cross beam 14 is provided on the seat body 10, and the second end of the seat body 10 is one end, away from the carriage side wall 30, of the top cross beam 14.

In order to balance force on the entire seat body 10, furthermore, an end of the suspension mounting rod 40 is provided with an articulated element, and the suspension mounting rod 40 is hinged to the seat body 10 by the articulated element. In addition, in order to facilitate mounting and reduce occupation of the space in a carriage, the end of the suspension mounting rod 40 is connected to the backrest 12, so as to suspend and support the second end of the seat body 10, thereby guaranteeing the reliability of the seat body 10.

According to the seat mounting structure of the embodiment of the disclosure, an upper portion and a lower portion of one side, close to the carriage side wall 30, of the seat body 10 are each provided with a side wall mounting member 20 for connecting the seat body 10 to the carriage side wall 30. One side, close to an aisle, of the seat body 10 is connected to the seat body 10 by the suspension mounting rod 40, and the suspension mounting rod 40 is connected to a top framework of a vehicle body, and the suspension mounting rod 40 may also be used as a grab rail. In this way, the seat body 10, the suspension mounting rod 40, the carriage side wall 30 and the top framework of the vehicle body are connected to form a closed structure. The structural strength of the full-cantilever seat is ensured. The entire structure is free of redundant mounting bases or connector, such that the structural strength is guaranteed, compactness, light weight and elegant appearance of the structure are guaranteed to the greatest extent, and the floor below the seat body 10 and the carriage side wall 30 are cleaned smoothly.

A second aspect of the disclosure provides a train. The train includes a seat mounting structure which is the seat mounting structure of the above embodiments. The train applying the seat mounting structure of the above embodiments may provide an effective support for a suspension seat to improve a structural strength of the suspension seat without increasing a size of a mounting base at the side wall. The problem of low structural strength of a cantilever seat in the related art is solved.

The foregoing is merely illustrative of the preferred embodiments of the disclosure and is not intended to be limiting of the disclosure, and various changes and modifications is made by those skilled in the art. Any modifications, equivalent substitutions, improvements, and the like within the spirit and principles of the application are intended to be included within the scope of the disclosure.

What is claimed is:
1. A seat mounting structure, comprising:
a seat body (10);
a side wall mounting member (20), wherein a first end of the seat body (10) is connected to a carriage side wall (30) by the side wall mounting member (20); and
a suspension mounting rod (40), wherein one end of the suspension mounting rod (40) is connected to a carriage roof, and the other end of the suspension mounting rod (40) is connected to a second end of the seat body (10);
wherein the first end of the seat body (10) is one end, close to the carriage side wall (30), of the seat body (10), and the second end of the seat body (10) is one end, away from the carriage side wall (30), of the seat body (10),
wherein a plurality of the side wall mounting members (20) are provided, and the first end of the seat body (10) is fixedly connected to the carriage side wall (30) by the plurality of side wall mounting members (20), and the plurality of side wall mounting members (20) are arranged at intervals in a height direction of the carriage side wall (30);
wherein the seat body (10) comprises a bottom plate (11) and a backrest (12), the plurality of side wall mounting members (20) comprise a first side wall mounting member (21), and the bottom plate (11) is fixedly connected to the carriage side wall (30) by the first side wall mounting member (21),
wherein the first side wall mounting member (21) comprises a connector (211) and a fastener (212), the connector (211) being connected to the seat body (10), and the fastener (212) penetrating the connector (211) and the carriage side wall (30),
wherein the carriage side wall (30) comprises a shield plate (31), the connector (211) is a bent plate, and the fastener (212) is a fastening bolt, the fastening bolt penetrating the bent plate and the shield plate (31) to fasten the bent plate and the shield plate (31).
2. The seat mounting structure according to claim 1, wherein the seat body (10) comprises opposite two side plate portions (13), the two side plate portions (13) defining a seating area for accommodating a passenger; and the con- nector (211) is connected to a bottom of the side plate portion (13), close to the carriage side wall (30), of the seat body (10).

3. The seat mounting structure according to claim 1, wherein the plurality of side wall mounting members (20) further comprise a second side wall mounting member (22), and the backrest (12) is fixedly connected to the carriage side wall (30) by the second side wall mounting member (22).

4. The seat mounting structure according to claim 3, wherein the seat body (10) comprises opposite two side plate portions (13), the two side plate portions (13) defining a seating area for accommodating a passenger; and the second side wall mounting member (22) penetrates the side plate portion (13), close to the carriage side wall (30), of the seat body (10) and the carriage side wall (30).

5. The seat mounting structure according to claim 4, wherein the second side wall mounting member (22) has a threaded rod section, a threaded stud is provided on the carriage side wall (30), and the second side wall mounting member (22) penetrates the side plate portion (13) and the shield plate (31) of the carriage side wall (30) and then is in threaded connection to the threaded stud.

6. The seat mounting structure according to claim 1, wherein the seat body (10) comprises opposite two side plate portions (13), the two side plate portions (13) defining a seating area for accommodating a passenger; and the first end of the seat body (10) is the side plate portion (13), close to the carriage side wall (30), of the seat body (10), and the second end of the seat body (10) is one end, away from the carriage side wall (30), of a top of the seat body (10).

7. The seat mounting structure according to claim 1, wherein a top cross beam (14) is provided on the seat body (10), and the second end of the seat body (10) is one end, away from the carriage side wall (30), of the top cross beam (14).

8. The seat mounting structure according to claim 3, wherein a shield plate (31) is provided on the carriage side wall (30), and the shield plate (31) is arranged in a vertical direction and opposite the backrest (12);
wherein the second side wall mounting member (22) penetrates into the shield plate (31) so as to fixedly connect the backrest (12) to the carriage side wall (30).

9. The seat mounting structure according to claim 1, wherein a boss structure (32) is provided at a bottom of the carriage side wall (30), and the boss structure (32) extends in an extension direction of the carriage side wall (30);
wherein the first side wall mounting member (21) abuts against an upper surface of the boss structure (32).

10. The seat mounting structure according to claim 1, wherein the seat body (10) comprises a bottom plate (11) and a backrest (12),
the suspension mounting rod (40) being connected to the backrest (12).

11. The seat mounting structure according to claim 1, wherein an end of the suspension mounting rod (40) is provided with an articulated element, and the suspension mounting rod (40) is hinged to the seat body (10) by the articulated element.

12. A train, comprising a seat mounting structure being the seat mounting structure according to claim 1.

13. The train according to claim 12, wherein a plurality of the side wall mounting members (20) are provided, and the first end of the seat body (10) is fixedly connected to the carriage side wall (30) by the plurality of side wall mounting members (20).

* * * * *